United States Patent Office 2,997,404
Patented Aug. 22, 1961

2,997,404
REMOISTENING ADHESIVE COMPOSITIONS
Walter Bush Roberson, Palatka, and Herbert Walter Craig, San Mateo, Fla., assignors to Hudson Pulp & Paper Corp., New York, N.Y., a corporation of Maine
No Drawing. Filed Mar. 12, 1958, Ser. No. 720,826
7 Claims. (Cl. 106—205)

This invention relates to remoistening adhesive compositions especially suitable for the manufacture of gummed tape and other adhesive sheets. Remoistening adhesive compositions of this general type are disclosed in United States Letters Patent 2,791,512, dated May 7, 1957, and the present invention is an improvement in the compositions disclosed in the said patent.

It has been found that certain improvements and modifications may be made in the adhesives disclosed in the said patent. For example, in some instances it is highly desirable and indeed may even be considered essential that the penetration of the moistened adhesives applied to the paper backing of tape be limited to minimize curling of the sheet. Again when the tape is coated with the adhesives disclosed, dried and later re-moistened it is often necessary to minimize the penetration of the re-moistening water into the paper backing to avoid or limit curling of the backing.

Furthermore, in some instances greater flexibility in the amount of "open time" of the remoistened adhesive sheet or tape is required. By open time is meant the period after the adhesive has been remoistened and during which its tack or stickiness is maintained at a high level, i.e. before substantial drying has occurred. Again high initial tack is often required in conjunction with the desired open time.

Initial tack is conventionally determined by a McLaurin tack tester which measures the relative tack of a remoistened adhesive tape or sheet 5 seconds after remoistening. In this test a rating of 85 is regarded as maximum. Conventional animal glue usually exhibits a rating of 75 and has an open time of about 25 seconds.

It has been found that the desired advantages in minimizing water penetration into the backing (and thus lowering the tendency to curl while the tape is wet) while at the same time achieving high initial tack (which is equal to or superior to that of conventional animal glues) and the ability to vary the open time to be equal to, less than or greater than that of animal glue may be attained by the present invention.

The aforementioned patent (No. 2,791,512, May 7, 1957), states that starches containing substantial quantities of amylose exhibit little or no tack or adhesiveness when coated on paper and remoistened. We have found however that when starches or dextrines containing substantially no amylose (waxy maize) are mixed with small quantities of sorbitol and corn dextrine containing approximately 20% amylose the tendency of the amylose free dextrine to wet extremely fast is considerably modified depending upon the quantity of corn dextrine added. Quantities in the order of about 15% slow up the rate of wetting and considerably increase the open time of the adhesive. The extent of modification depends upon the quantity of corn dextrine added.

Example 1

(Fast tape: Rapid wetting, open time of 15 seconds and McLaurin tack of 85)

Ingredient: Parts by weight
A. Viz. converted or dextrinized amylopectin (having a viscosity of 30 cp. in 20% aqueous solution at 130° F.) _____ 1300
B. Viz. converted or dextrinized amylopectin (having a viscosity of 886 cp. in 20% aqueous solution at 130° F.) _____ 500
Sodium nitrate _____ 100
C. Viz. a sorbitol solution of which 85% is solids, e.g. sorbitol G-2401 as supplied by Atlas Powder Co., Wilmington, Delaware (solids= 2.64 percent by weight of A+B)_ 56 (solids: 47.6)
Balance water to make a total solids content of about 45%.

Example 2

(Slow tape: Slow wetting, open time of 50 seconds and McLaurin tack of 70-75)

Ingredient: Parts by weight
A. (As in Example 1) _____ 950
B. (As in Example 1) _____ 300
Sodium nitrate _____ 350
Corn dextrine (28 percent by weight of A+B) _____ 350
C. (As in Example 1) (solids=3.8 percent by weight of A+B) _____ 56 (solids: 47.6)
Water to make 45% total solids.

The adhesive formula of Example 1 yields a glossy adhesive coating which is somewhat thicker and more brittle (and thus easier to break) than the adhesive of Example 2.

Example 3

Ingredient: Parts by weight
A. (As in Example 1) _____ 1000
B. (As in Example 1) _____ 400
Sodium nitrate _____ 300
Corn dextrine (14.3 percent by weight of A+B) _____ 200
C. (As in Example 1) (solids=3.4 percent by weight of A+B) _____ 56 (solids: 47.6)
Balance water to make total solids content of 45%.

In place of the specific viscosity depressing material disclosed above, namely, sodium nitrate, one may also use other depressants such as urea, zinc chloride, sodium chloride and the like.

The viscosity of the foregoing adhesive compositions lies between 2,000 and 20,000 cp. at 130° F.

It is to be noted that the foregoing examples are intended to be illustrative of the principles of the invention and that variation in the specific proportions of the ingredients may be made within the scope of the invention, as defined more particularly in the appended claims.

What is claimed is:

1. A remoistening adhesive composition consisting essentially of an intimate mixture of water, dextrinized amylopectin substantially free of amylose, about 3 to 4 percent of sorbitol, and between about 15 percent and about 30 percent of corn dextrine, said percentages being based on the weight of dextrinized amylopectin, said corn dextrine containing approximately 20 percent amylose.

2. A remoistening adhesive composition according to claim 1 with the addition of a water-soluble viscosity depressing agent.

3. A remoistening adhesive composition according to claim 1 wherein the viscosity of said adhesive is between about 2,000 and 20,000 centipoises at 130° F.

4. A remoistening adhesive composition according to claim 2 wherein said agent is sodium nitrate.

5. A remoistening adhesive composition according to claim 2 wherein said agent is zinc chloride.

6. A remoistening adhesive composition according to claim 2 wherein said agent is sodium chloride.

7. A remoistening adhesive composition according to claim 2 wherein said agent is urea.

References Cited in the file of this patent

UNITED STATES PATENTS

| | | |
|---|---|---|
| 2,126,520 | Wakeman | Aug. 9, 1938 |
| 2,145,195 | Bauer | Jan. 24, 1939 |
| 2,188,329 | Bauer et al. | Jan. 30, 1940 |
| 2,624,681 | Rapp | Jan. 6, 1953 |
| 2,716,612 | Marks et al. | Aug. 30, 1955 |
| 2,791,517 | Hatch et al. | May 7, 1957 |
| 2,801,184 | Miyamoto | July 30, 1957 |

OTHER REFERENCES

Gregory: "Uses and Applications of Chemicals and Related Materials" (1939), page 565.